United States Patent
Weitzenhof et al.

(10) Patent No.: US 6,637,733 B1
(45) Date of Patent: Oct. 28, 2003

(54) AIR SPRING WITH VIBRATION ISOLATION

(75) Inventors: David A. Weitzenhof, Bath, OH (US); Mark D. Hilburger, Carmel, IN (US)

(73) Assignee: BFS Diversified Products, LLC, Carmel, IN (US)

( * ) Notice: Subject to any disclaimer, the term of this patent is extended or adjusted under 35 U.S.C. 154(b) by 0 days.

(21) Appl. No.: 10/170,824

(22) Filed: Jun. 12, 2002

(51) Int. Cl.[7] .................................................. F16F 9/04
(52) U.S. Cl. ............................. 267/64.27; 267/64.24; 267/64.21
(58) Field of Search ..................... 267/64.24, 64.21, 267/64.27, 64.19, 64.23, 122; 188/322.17, 322.16, 322.18, 322.11

(56) References Cited

U.S. PATENT DOCUMENTS

| | | | | |
|---|---|---|---|---|
| 3,475,015 A | * | 10/1969 | Hirst | 267/64.24 |
| 5,575,360 A | * | 11/1996 | Gubitz et al. | 188/298 |
| 5,636,831 A | * | 6/1997 | Gubitz | 267/64.24 |
| 5,707,045 A | * | 1/1998 | Easter | 267/64.21 |
| 5,752,692 A | * | 5/1998 | Crabtree et al. | 267/64.24 |
| 5,975,506 A | * | 11/1999 | Thurow et al. | 267/64.23 |
| 6,234,460 B1 | * | 5/2001 | Arnold | 267/35 |
| 6,264,178 B1 | * | 7/2001 | Schisler et al. | 267/64.27 |
| 6,460,836 B1 | * | 10/2002 | Trowbridge | 267/64.27 |

* cited by examiner

Primary Examiner—Christopher P. Schwartz
Assistant Examiner—Devon Kramer
(74) Attorney, Agent, or Firm—Michael R. Huber; Michael Sand

(57) ABSTRACT

An air spring has a pair of end members which are sealingly connected to ends of a flexible sleeve and form an internal fluid chamber. A rigid annular member is located within the fluid chamber and is spaced from one of the end members and clamps the sleeve against a rigid member located outside of the sleeve and fluid chamber. A vibration isolator, such as an annular elastomeric member, is located between the rigid outer member and the adjacent end member to support the sleeve and reduce its tension in order to isolate sleeve vibration from the end member.

20 Claims, 3 Drawing Sheets

AIR SPRING WITH VIBRATION ISOLATION

BACKGROUND OF THE INVENTION

1. Technical Field

The invention relates to air springs, and in particular to air springs for vehicles which have a vibration absorbing assembly incorporated therein to isolate the air spring sleeve vibrations from the adjacent end member and vehicle.

2. Background Information

Air springs typically include two end members which are sealingly connected to respective ends of a hollow fabric reinforced elastomeric sleeve. These air springs are used primarily for implementation in motor vehicles for supporting the vehicle body or for use in other types of equipment subject to shock to provide cushioning therefor. The air springs are sealed at the ends to form a pressurized fluid chamber within the sleeve. The air spring will generate a certain load at a given height and pressure, and upon the spring experiencing a road displacement input, the sleeve will begin to compress or extend as the end members move toward and away from each other respectively, to provide predictable dynamic load characteristics. Sudden movement of one end of the air spring will cause vibration of the; elastomeric sleeve which is transmitted from the sleeve to the end members and to the vehicle structure affecting the ride characteristics of the vehicle and suspension system.

Various types of vibration isolation have been devised to reduce or prevent the transmission of the sleeve vibrations to the end members and connected vehicle components. Certain of these vibration isolators use various types of elastomeric materials located at the end of the air spring where it is sealed to the end member, such as shown in U.S. Pat. Nos. 4,697,797 and 6,123,325. Other types use bearings and elastomeric materials at the connection of end cap or end members to the supporting vehicle structure, as shown in U.S. Pat. No. 5,690,319. Other types of air spring vibration isolation methods and apparatus use an elastomeric isolator which is mounted on the sleeve in such a manner to require additional sealed connections of the sleeve and vibration isolator, thus creating a potential leak path past the air sleeve from the interior pressure chamber. It is always desirable to reduce to a minimum the number of possible air leak paths from the internal fluid chamber of the air spring to the surrounding atmosphere.

Thus it is desirable to provide an air spring with vibration isolation which does not create a potential additional leak path from the internal fluid chamber to the surrounding atmosphere, yet which is usable with existing air spring constructions without increasing the effective height and size of the air spring, and which can be accomplished in a relatively simple and economical manner.

BRIEF SUMMARY OF THE INVENTION

What the art needs is an air spring assembly which allows for control of the vibrations generated within or transmitted through the air spring sleeve from reaching the end members and vehicle structure without significantly changing the physical size and operating characteristics of the air spring.

The air spring of the present invention uses an elastomeric vibration isolator which is clamped to the air spring sleeve at a spaced distance from one of the end members by a rigid annular ring-like member located within the fluid chamber of the air spring sleeve which ring-like member sandwiches and clamps a portion of the sleeve to an outer rigid member. The sleeve is supported by this device, reducing sleeve tension and vibration transmission to the upper end closure by the air spring. This rigid outer member is isolated either from the end member by an elastomeric vibration isolator or from the sleeve with an elastomeric isolator, either of which will attenuate the transmission of the sleeve vibrations to the end member.

A further feature of the invention is to provide a mounting arrangement for a vibration isolator on the air spring sleeve without piercing or harming the sleeve and creating a potential air leak path between the internal pressure chamber and surrounding atmosphere.

Another aspect of the invention is to enable the vibration isolator to be mounted externally of the air spring and clamped to the sleeve and used in conjunction with a rigid restraining cylinder which extends along the air sleeve to reduce the outward radial expansion of the sleeve, and which protects the sleeve from the surrounding environment.

The internal rigid member, which mounts the elastomeric isolator in position, may have an outwardly curved surface to form a convolution in the air spring to assist its movement between compressed and expanded positions and to prevent pinching of the sleeve between the isolator components.

The foregoing advantages, construction and operation of the present invention will become readily apparent from the following description and accompanying drawings.

BRIEF DESCRIPTION OF THE DRAWINGS

Similar numerals refer to similar parts through the drawings.

DETAILED DESCRIPTION OF THE INVENTION

Figure 1:
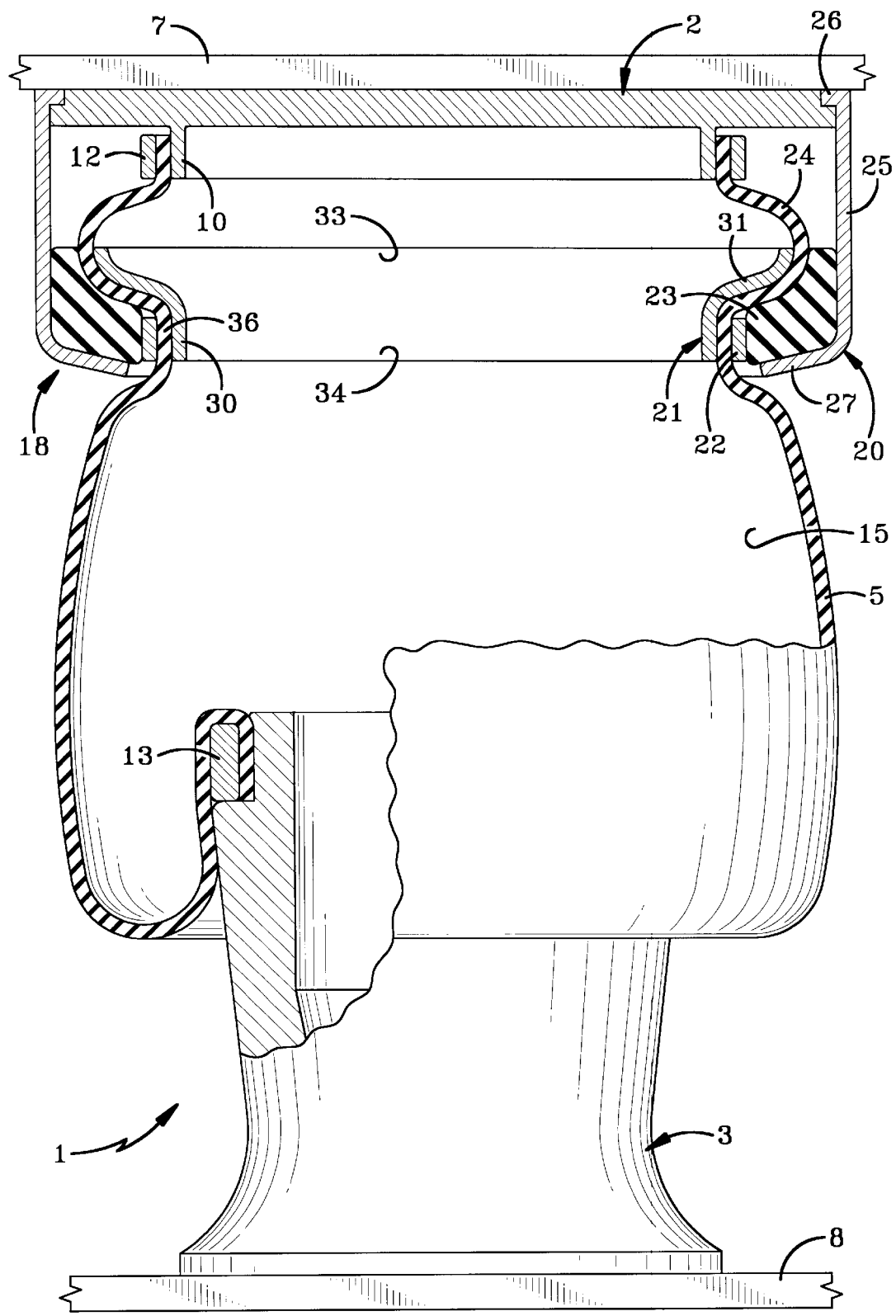
FIG. 1 is a side elevational view with portions broken away and in section, showing an air spring mounted between two spaced components containing the vibration isolation feature.

A first embodiment of a vehicle air spring assembly according to the present invention, is shown in FIG. 1 and is indicated generally at 1. Air spring assembly 1 generally includes a top end plate 2 and a bottom end member 3 such as a usual piston, with a flexible bladder or sleeve 5 extending between and connected to end members 2 and 3. End member 2 and piston 3 attach to two spaced components 7 and 8, respectively, for providing cushioning therebetween. Members 7 and 8 may be parts of a motor vehicle, such as a vehicle chassis and vehicle axle or any other device where cushioning is desired between two spaced members.

Sleeve 5 is sealingly connected with an annular flange 10 of end plate 2 by a usual clamp ring 12 and to piston 3 by a clamp ring 13 and forms a pressurized fluid chamber 15 therein. Sleeve 5 preferably is formed of an elastomeric material and includes fabric reinforcing cords embedded therein to strengthen the sleeve and restrict the inflated diameter as the sleeve is expanded and compressed during operation of air spring assembly 1. Sleeve 5 can be sealingly attached to end members 2 and 3 by other types of connections, such as having a beaded end and a rolled crimped configuration provided by one or both of the end members without affecting the concept of the invention. Likewise, end members 2 and 3 can have various other configurations than that shown in FIG. 1 without, affecting the concept of the invention. End member 2 preferably will have various openings (not shown) for connection to a fluid supply line which is connected to a remote source of pressurized air, all of which is well known in the air spring art.

In accordance with the invention, a vibration isolation assembly indicated generally at 18, is operatively connected between sleeve 5 and end member 2. Assembly 18 includes a rigid outer member 20, a rigid inner member 21, a swage ring 22, and an elastomeric isolator 23. Outer member 20 has a cylindrical portion 25 which has a top inwardly extending end,flange 26 which is rigidly connected by some type of connection, to end member 2, such as by welding, bonding, press fit, or the like. The opposite end of cylindrical portion 25 terminates in an inwardly tapered flange 27.

Rigid inner member 21 has an annular configuration and is formed with a lower cylindrical portion 30 and an upper outwardly curved portion 31. As shown in FIG. 1, inner member 21 has generally circular-shaped top and bottom openings 33 and 34, with top opening 33 having a greater diameter than bottom opening 34. Swage ring 22 clamps sleeve 5 against inner member 21 at a location 36.

Elastomeric isolator 23 has an irregular shape (and matches) the curvature of curved portion 31 of inner member 21 to form an outwadly extending convolution 24 in sleeve 5. Isolator 23 also matches cylindrical wall portion 25 and tapered flange 27 of outer member 20, as well as abut against and matching the outer surface of swage ring 22.

Thus as shown in FIG. 1, elastomeric isolator 23 is in a secured fixed position adjacent clamped sleeve area 36 so that the vibrations developed on sleeve 5 are absorbed by isolator 23, attenuating their transmission to clamp ring 12 and end member 2 and subsequently to vehicle component 7. Furthermore, since member 21 is located within pressure chamber 15, it does not create any possible leak path to the surrounding atmosphere.

Figure 2:
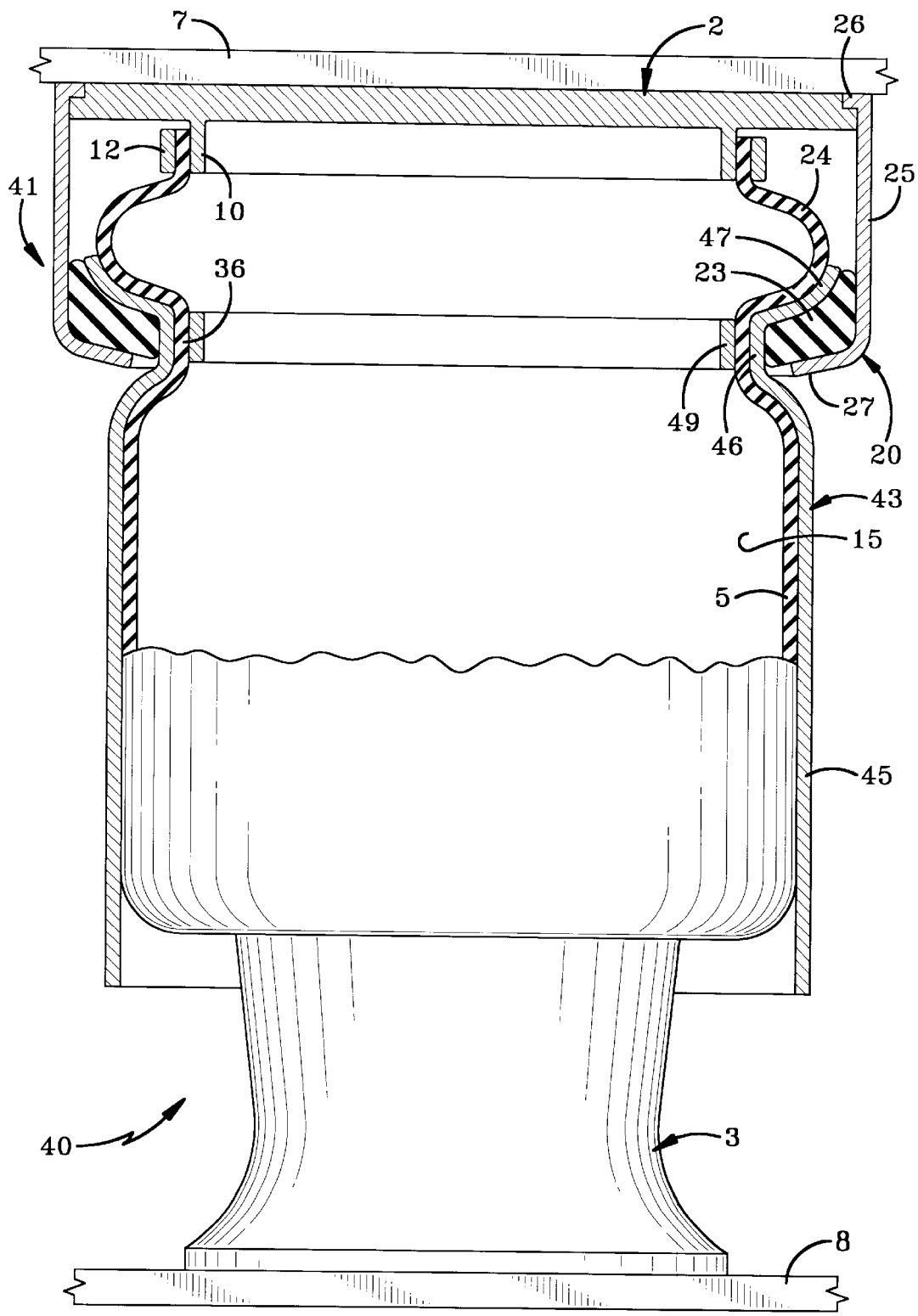
FIG. 2 is a view similar to FIG. 1 showing a modified vibration isolator.

A second embodiment of an air spring containing a vibration isolation, assembly is indicated generally at 40, and is shown in FIG. 2. Air spring 40 is similar to air spring 1 described above, but has a different vibration isolation assembly indicated generally at 41, mounted thereon. Assembly 41 includes a similar rigid outer member 20 which is rigidly connected to end member 2 and configured elastomeric isolator 23. In addition to member 20, assembly 41 includes a second rigid portion 43 which has a cylindrical portion 45 which extends axially along and outside of sleeve 5. Rigid portion 43 terminates in an annular clamping portion 46 and an upper outwardly curved portion 47.

Cylindrical portion 45 forms a restraining canister to limit the radial outward expansion of sleeve 5 when the air spring moves towards a collapsed or compressed position and protects the sleeve form the surrounding environments, and from puncture and possible damage from road debris and adjacent vehicle components. Rigid outer member 43 is clamped to sleeve, area 36 by an annular inner rigid member or clamp ring 49 which is located within fluid chamber 15. Member 49 clamps sleeve area 36 against clamping portion 46 of outer member 43 and forces clamping portion 46 of member 43 against elastomeric isolator 23 securing it in a fixed position between cylindrical portion 25 and tapered portion 27 of member 20 and against portions 46 and 47 of member 43. Thus isolator 41 attenuates the transmission of vibrations of sleeve 5 to end member 2 and subsequently to vehicle component 7 without adding any possible air leakage paths in sleeve 5.

Figure 3:
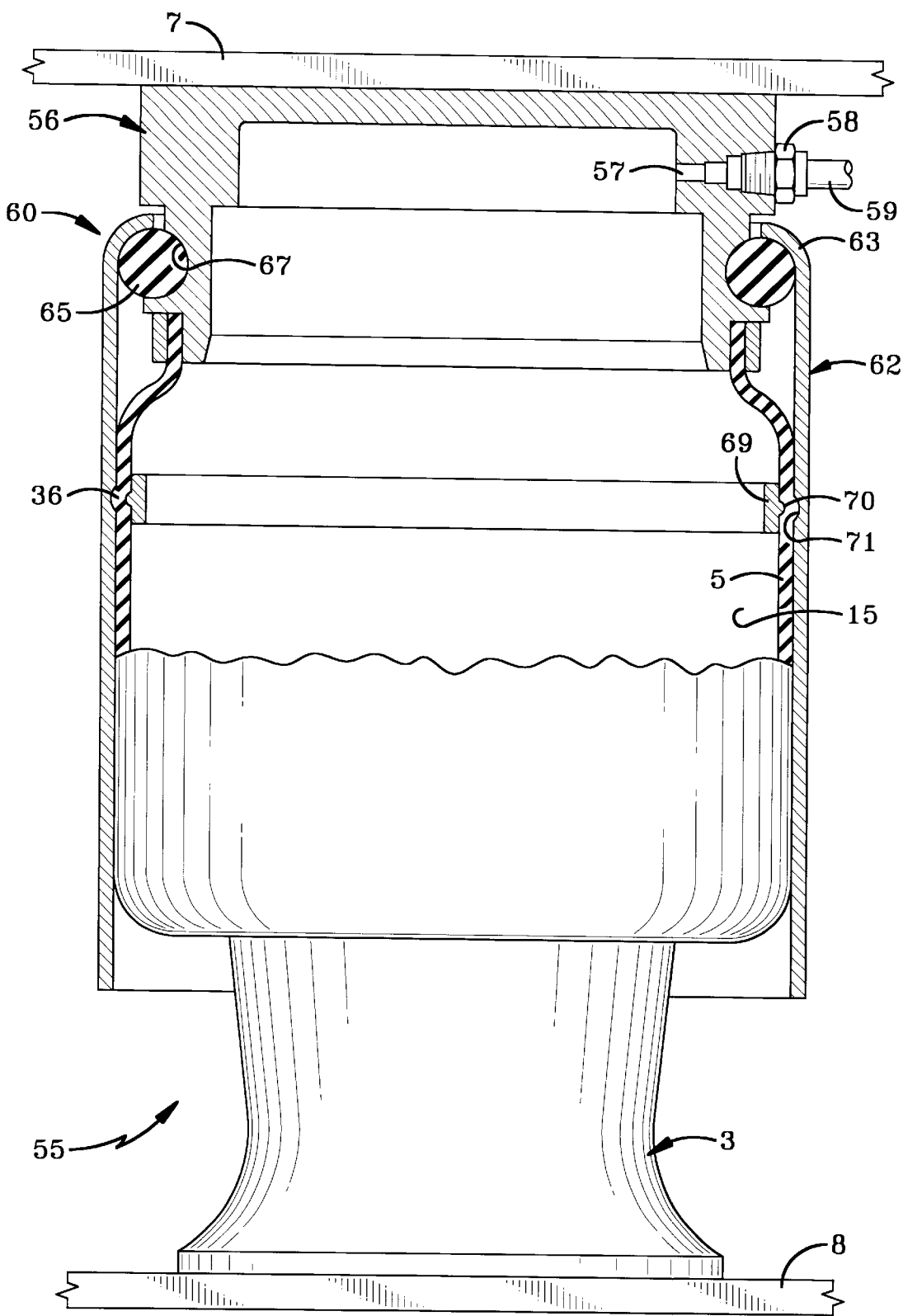
FIG. 3 is a view similar to FIGS. 1 and 2 of a further modified vibration isolator.

A third embodiment of the air spring of the present invention is indicated generally at 55, and is shown in FIG. 3. Air spring 55 has a modified upper end member 56 which includes a fluid access opening 57 in which a connector 58 is inserted for securing a fluid supply line 59 therein. Line 59 will be connected to a remote source of pressurized air, such as a compressor which is usually located within the vehicle for admitting and discharging fluid, which is usually air, into and out of fluid chamber 15. A modified vibration absorbing assembly 60 is mounted between end member 56 and sleeve 5 and includes a rigid annular outer member 62 which has a cylindrical configuration and terminates in an inwardly curved upper end 63. Outer member 62 forms a restraining canister similar to cylindrical portion 45 of embodiment 40, to restrain the outward expansion of sleeve 5.

Outer rigid member 62 is resiliently mounted to end member 56 by an elastomeric vibration isolator 65 which may have an circular cross-sectional configuration as shown in FIG. 3, which is seated within a semi-circular cut-out 67 formed in end member 56. Isolator 65 is retained after insertion into the assembly by mechanical or adhesive means. A rigid inner member 69 clamps sleeve portion 36 between the outer surface of member 69 and rigid outer member 62. A dimple 70 may be formed on the outer surface of member 69 which is seated within a complementary shaped recess 71 formed in outer member 62 to help position member 69 within air chamber 15 and to maintain a tight clamping engagement of sleeve 5 between rigid members 62 and 69. Again, isolator 65 attenuates the vibrations developed in sleeve 5 which heretofore would be transmitted to end member 56. Again, as in embodiments 1 and 40 described above, rigid inner member 69 which is located within pressure chamber 15, is spaced axially from the adjacent end member and clamps a portion of sleeve 5 against the annular rigid outer member so that the elastomeric isolator is positioned between a rigid outer member and a rigid end member to which it is connected, to attenuate transmission of the sleeve vibrations to the end member, all without piercing the sleeve or creating another possible leakage path between the sleeve and the outer surrounding atmosphere.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. An air spring comprising:

first and second spaced end members;

a flexible sleeve sealingly attached directly to the end members and extending therebetween and forming an interior fluid chamber; and a vibration absorbing assembly operatively connected to the sleeve to isolate sleeve vibration from said first end member, said absorbing assembly including a rigid outer annular member operatively attached to the first end member and extending along at least a portion of said sleeve, a rigid inner annular member located within the fluid chamber and spaced away from the first end member and clamping the sleeve against said rigid outer annular member reducing sleeve tension, and thus vibration transmission, and a vibration isolator located between the sleeve and the first end member to support the sleeve and reduce the transmission of sleeve vibration to said first end member.

2. The air spring defined in claim 1 wherein the rigid outer member includes a cylindrical canister extending along the sleeve; and in which the vibration isolator is an elastomeric member resiliently attaching the canister to the first end member.

3. The air spring defined in claim 1 wherein the vibration isolator is an annular band of an elastomeric material; and in which said band is located between the sleeve and the rigid outer member.

4. The air spring defined in claim 1 wherein the rigid outer member is a two piece member which includes a first piece which is attached to the first end member and a second piece which extends along the sleeve; and in which the vibration isolator is located between the first and second pieces.

5. The air spring defined in claim 4 wherein the second rigid piece has a lower cylindrical portion, an intermediate annular clamping portion and an outwardly curved portion; and in which the rigid inner member clamps the sleeve against the intermediate clamping portion of said second rigid piece.

6. The air spring defined in claim 5 wherein the first rigid piece has a cylindrical portion which terminates in an inwardly extending flange which defines an open end; and in which the vibration isolator is seated on said inwardly extending flange of the first rigid piece and is clamped thereon by the rigid inner annular member.

7. The air spring defined in claim 5 wherein the vibration isolator has an irregular shape with a pair of side surfaces which are clamped between the inwardly extending flange of the first rigid piece and the outwardly curved portion of the second rigid piece.

8. The air spring defined in claim 1 wherein the rigid inner annular member has an annular sidewall terminating in a pair of circular open ends having unequal diameters.

9. The air spring defined in claim 8 wherein the sidewall in cross section has a cylindrical portion and a curved portion and in which the sleeve is clamped between said cylindrical portion of said inner rigid member and an outer swage ring.

10. The air spring defined in claim 9 wherein the vibration isolator is located between the swage ring and the rigid outer member.

11. The air spring defined in claim 10 wherein the rigid outer member is rigidly secured to the first end member.

12. The air spring defined in claim 9 wherein the sleeve generally conforms to the shape of the curved portion of the inner annular member to form a radially outwardly extending convolution in the sleeve.

13. The air spring defined in claim 1 wherein the sleeve has first and second open ends; and in which a swage ring sealingly clamps said first open end to the first end member.

14. The air spring defined in claim 1 wherein the second end member is a piston.

15. The air spring defined in claim 1 wherein the rigid inner and outer members have complementary shaped surfaces with the sleeve being clamped therebetween.

16. A vehicle suspension system comprising:

first and second vehicle components;

first and second end members mounted on the first and second vehicle components respectively;

a flexible sleeve sealingly attached directly to the end members and extending therebetween and forming an interior fluid chamber; and a vibration absorbing assembly operatively connected to the sleeve to isolate sleeve vibration from said first end member, said absorbing assembly including a rigid outer annular member operatively attached to the first end member and extending along at least a portion of said sleeve, a rigid inner annular member located within the fluid chamber and spaced away from the first end member and clamping the sleeve against said rigid outer annular member, and a vibration isolator located between the sleeve and the first end member to reduce the transmission of sleeve vibration to said first end member.

17. The vehicle suspension system defined in claim 16 wherein the rigid outer member includes a cylindrical canister extending along the sleeve; and in which the vibration isolator is an elastomeric member attaching the canister to the first end member.

18. The vehicle suspension system defined in claim 16 wherein the vibration isolator is an annular band of an elastomeric material; and in which said band is located between the sleeve and the rigid outer member.

19. The vehicle suspension system defined in claim 16 wherein the rigid outer member is a two piece member which includes a first piece which is attached to the first end member and a second piece which extends along the sleeve; and in which the vibration isolator is located between the first and second pieces.

20. The vehicle suspension system defined in claim 19 wherein the second rigid piece has a lower cylindrical portion, an intermediate annular clamping portion and an outwardly curved portion; and in which the rigid inner member clamps the sleeve against the intermediate clamping portion of the rigid outer member.

* * * * *